(12) United States Patent
Giron

(10) Patent No.: US 6,940,628 B2
(45) Date of Patent: Sep. 6, 2005

(54) ELECTROCHEMICAL DEVICE

(75) Inventor: Jean-Christophe Giron, Paris (FR)

(73) Assignee: Saint-Gobain Vitrage, Courbevoie (FR)

( * ) Notice: Subject to any disclaimer, the term of this patent is extended or adjusted under 35 U.S.C. 154(b) by 0 days.

(21) Appl. No.: 10/773,170

(22) Filed: Feb. 9, 2004

(65) Prior Publication Data

US 2004/0155263 A1 Aug. 12, 2004

Related U.S. Application Data

(63) Continuation of application No. 09/814,703, filed on Mar. 23, 2001, now Pat. No. 6,791,737, which is a continuation of application No. 08/825,100, filed on Mar. 27, 1997, now Pat. No. 6,277,523.

(30) Foreign Application Priority Data

Mar. 27, 1996 (FR) .............................................. 96 03799

(51) Int. Cl.⁷ ........................... G02F 1/15; G02F 1/155; G02F 1/153; H01M 6/18
(52) U.S. Cl. ....................... 359/265; 359/266; 359/270; 359/273; 429/304
(58) Field of Search ................................ 359/265, 266, 359/270, 273, 275; 429/304, 322, 306, 300; 29/623.5; 204/422, 290.07; 546/257; 544/347; 345/107; 252/583, 600; 428/432

(56) References Cited

U.S. PATENT DOCUMENTS

| | | | |
|---|---|---|---|
| 4,013,343 A | 3/1977 | Jaccard et al. | |
| 4,731,705 A | 3/1988 | Velasco et al. | |
| 4,748,542 A | 5/1988 | Lundsgaard | |
| 4,763,139 A | 8/1988 | Itoh et al. | |
| 4,832,463 A | 5/1989 | Goldner et al. | |
| 5,189,549 A | 2/1993 | Leventis et al. | |
| 5,580,681 A | 12/1996 | Fleischer | |
| 5,663,829 A | 9/1997 | Lefrou et al. | |
| 5,985,486 A | 11/1999 | Giron | |
| 6,337,758 B1 | 1/2002 | Beteille et al. | |
| 6,529,308 B2 | 3/2003 | Beteille et al. | 359/265 |
| 6,746,775 B1 * | 6/2004 | Boire et al. | 428/432 |
| 6,747,779 B1 * | 6/2004 | Morin et al. | 359/265 |
| 2002/0037421 A1 * | 3/2002 | Arnaud et al. | 428/472 |
| 2004/0005472 A1 * | 1/2004 | Arnaud et al. | 428/472 |
| 2004/0053125 A1 * | 3/2004 | Giron et al. | 429/152 |
| 2004/0067343 A1 * | 4/2004 | Beteille et al. | 428/192 |
| 2004/0169789 A1 * | 9/2004 | Mathey et al. | 349/86 |

FOREIGN PATENT DOCUMENTS

| | | |
|---|---|---|
| EP | 0 058 995 A1 | 2/1982 |
| EP | 0 628 849 A1 | 12/1994 |
| GB | 2 007 864 A | 9/1978 |
| JP | 57-125924 | 8/1982 |
| JP | 59-61820 | 9/1984 |

\* cited by examiner

*Primary Examiner*—Georgia Epps
*Assistant Examiner*—Jack Dinh
(74) *Attorney, Agent, or Firm*—Oblon, Spivak, McClelland, Maier & Neustadt, P.C.

(57) ABSTRACT

An electrochemical device comprising at least one substrate (1,7), at least one electroconductive layer (2,6) at least one electrochemically active layer (3,5) capable of reversibly injecting ions, and an electrolyte (4), wherein the electrolyte (4) is a layer or a multilayer stack comprising at least one layer (4b) made of an ionically conductive material capable of reversibly injecting said ions but whose overall degree of oxidation is maintained essentially constant.

29 Claims, 4 Drawing Sheets

ELECTROCHEMICAL DEVICE

CROSS-REFERENCE TO RELATED APPLICATIONS

This application is a continuation of parent application Ser. No. 09/814,703 filed Mar. 23, 2001, now U.S. Pat. No. 6,791,737 which is a continuation of application Ser. No. 08/825,100 filed Mar. 27, 1997 now U.S. Pat. No. 6,277,523.

BACKGROUND OF THE INVENTION

1. Field of the Invention

The present invention relates to the field of electrochemical devices which include at least one electrochemically active layer which is capable of reversibly and simultaneously injecting ions and electrons, in particular electrochromic devices. These electrochemical devices are specially used to manufacturer glazings whose light and/or energy transmission or whose light reflection may be modulated by means of an electric current. They may also be used to manufacture energy storage elements such as batteries or gas sensors or display elements.

2. Description of the Background

Considering the particular example of electrochromic systems, it will be recalled that the latter include a layer of a material capable of reversibly and simultaneously injecting cations and electrons and whose oxidation states, corresponding to the injected state and to the ejected state, have a distinct color, one of the states generally being transparent. The injection or ejection reaction is controlled by a suitable power supply, especially by applying a suitable potential difference. The electro-chromic material, which is generally based on tungsten oxide, must thus be brought into contact with a source of electrons such as a transparent electroconductive layer, and source of cations, such as an ionically conductive electrolyte.

Moreover, it is known that to ensure at least a hundred switching operations, a counterelectrode must be associated with the layer of electrochromic material, this counterelectrode also being capable of reversibly injecting cations, symmetrically with respect to the layer of electrochromic material so that, macroscopically, the electrolyte appears as a simple cation medium.

The counterelectrode must consist either of a layer which is neutral in color or at least transparent when the electrochromic layer is in the decolored state. Since tungsten oxide is a cathodic electrochromic material, that is to say that its colored state corresponds to the most reduced state, an anodic electrochromic material such as nickel oxide or iridium oxide is generally used for the counterelectrode. It has also been proposed to use a material which is optically neutral in the oxidation states in question, such as, for example, cerium oxide or organic materials like the electroconductive polymers (polyaniline, etc.) or Prussian blue.

Such systems are described, for example, in European Patent Nos. 0 338 876, 0 408 427, 0 575 207 and 0 628 849.

Currently, these systems may be grouped into two categories, depending on the type of electrolyte that they use:

(i) The electrolyte is in the form of a polymer or of a gel, for example a polymer exhibiting proton conduction, such as those described in European Patent Nos. 0 253 713 and 0 670 346, or a polymer exhibiting conduction of lithium ions such as those described in European Patent Nos. 0 382 623, 0 518 754, or 0 532 408;

(ii) The electrolyte is an inorganic layer which is ionically conductive but electronically insulating (one the speaks of "all-solid" electrochromic systems).

All these electrochemical devices allow satisfactory reversibility of the ion injection/ejection phenomena and, therefore, of the coloration/decoloration phenomena in the specific case of electrochromic systems. However, it seems that this reversibility character tends to degrade over time, especially because of prolonged exposure to ultraviolet rays, or to heat (for example when the temperature reaches 80° C.), or because of a large number of switching operations from one coloration state to another.

This problem has already been studied in the aforementioned European Patent No. 0 628 849. This patent proposes a first solution consisting of interposing between the electrolyte and the counterelectrode, a layer called a "barrier layer" which is permeable to the ions which it should reversibly inject/eject and which will limit the degradation of the system by regarding the irreversible reduction of the counterelectrode, or indeed its dissolution, in contact with the electrolyte. However, this solution has its limits, because, given the nature, resulting mainly from the method of manufacture, of the electroconductive layers which underlie the deposition of the electrochemically active layers, and mainly their significant roughness, it is observed that the barrier layer must be relatively thick in order to effectively fulfil the role of protecting the counterelectrode which is devolved thereon. Now, the drawback of a thick barrier layer resides in a partial or even total loss of the functionality of the entire system, or of part of the system; that is to say that it slows down or even suppresses the reversible ion injection/ejection reactions at one or both of the electrochemically active layers.

SUMMARY OF THE INVENTION

Accordingly, one object of the invention is to provide a means for increasing the durability of multilayer electrochemical systems capable of reversibly injecting ions, most particularly electrochromic systems, without encountering the drawback mentioned above.

Another object of the present invention is to provide a simplified method of manufacturing such electrochromic systems.

Briefly, these objects and other objects of the present invention as hereinafter will become more readily apparent can be attained in an electrochromic device which includes at least one substrate, at least one electroconductive layer, at least one electrochemically active layer capable of reversibly injecting ions, especially cations such as $H^+$, $Li^+$, $Na^+$, $Ag^+$, $K^+$ or anions of the $OH^-$ type, and an electrolyte. The electrolyte is a layer or a multilayer stack comprising at least one layer made of an ionically conductive material capable of reversibly injecting the ions but whose overall degree of oxidation is maintained essentially constant, which layer will be denoted for simplicity throughout the rest of the description by the term "layer A".

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
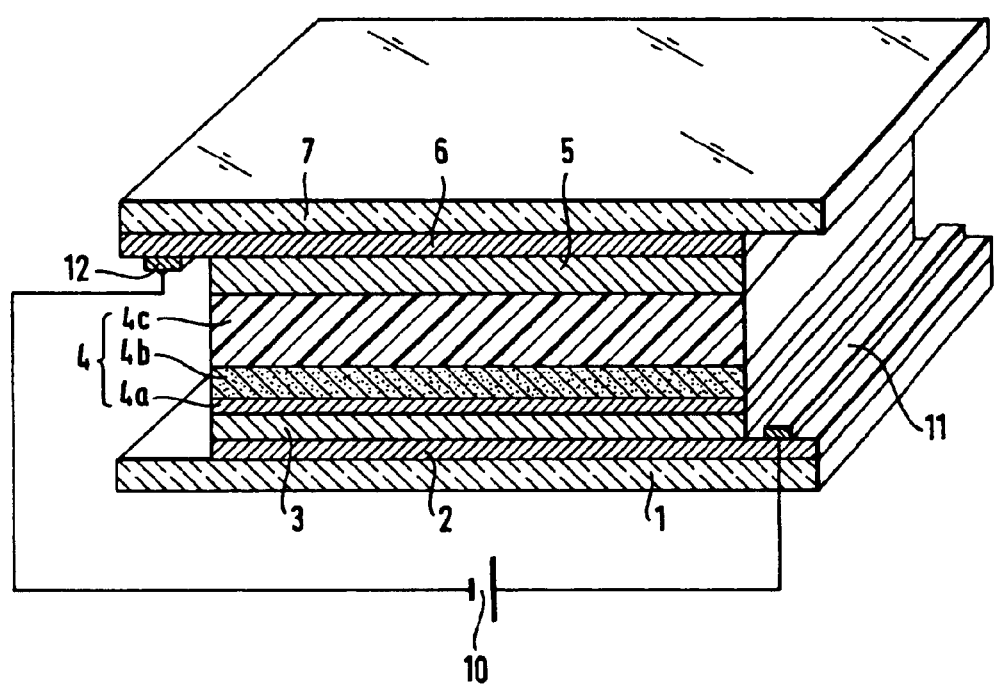
FIG. 1 is a representation of a first embodiment of an electrochromic glazing of the invention.

Within the context of the invention, with respect of this layer A, the term "material capable of reversibly injecting ions" is understood to mean any material or combination of materials which exhibit electrochemical injection, as well as any material or combination of materials which exhibit electrochemical injection, as well as any material or combination of materials called "supercapacitive", materials in which the chemical species remain on the surface of the said material or the said materials because of an electrostatic effect.

Still within the context of the invention, the "overall degree of oxidation" is understood to mean the degree of oxidation of the material or of all of the materials making up layer A. This degree of oxidation incorporates both the surface effects and the volume effects.

The inventors have resorted to an ion-injection material not only to form the electrochemically active layer or layers, something which was known, but also to form all or part of the electrolyte of the system. To use such a material as electrolyte is tantamount to turning it away from its usual primary function: by freezing it in a given state of injection, "inhibiting" its capacity to inject ions and electrons reversibly and simultaneously, with only its ion conduction/permeability properties then being used. It has been surprisingly found that it fulfils this role of an electrolyte very satisfactorily. Furthermore, as shown in the examples below, the choice of such a material as electrolyte offers many possibilities of implementation which significantly increases the durability/lifetime of the electrochemical devices. Such electrolytes permit device configurations in which the electrochemically active layers, especially those which act as the counterelectrode, are no longer exposed to degradations of the irreversible chemical reduction type or, what is worse, dissolution.

However, in order to manage to prevent the material of this layer A from reversibly injecting ions, it is necessary to maintain its overall degree of oxidation invariant. To do this, the invention proposes two non-limiting embodiments which may be treated as alternatives or may be combined.

According to the first embodiment, layer A is electrically insulated from at least one of the electron sources of the device, especially by interposing at least one layer of an electronically insulating material (by "electron source" is meant hear either an electrochemically active layer or an electroconductive layer). Preferably, these layers of electronically insulating material are chosen so as to be also ionically conductive/ion-permeable. Consequently, they may then form part of the electrolyte in the same way as layer A, the electrolyte being in this case in the form of a multilayer stack. Advantageously, they are then placed in direct contact with at least one of the faces of layer A.

According to the second embodiment, the overall degree of oxidation of layer A is maintained constant by: adapting the power supply to the terminals of the electroconductive layers of the device. All that is required is to adjust the supply in order to keep the electrical potential of layer A at values which are outside the range of potentials which would cause a variation in the degree of ion injection of the material of which it is composed. It then remains to select in a suitable manner the nature of this material and the nature of the material of the electrochemically active layer or layers so that this range of potentials is different from the range of potentials allowing operation of the system, that is to say different from the range of the potentials allowing reversible injection/ejection by the electrochemically active layers.

An example of a configuration according to one or other of the embodiments described above is produced by an electrochemical device which includes, in succession, an electroconductive layer, an electrochemically active layer capable of reversibly injecting cations, especially made of a cathodic electrochromic material, an electrolyte which includes layer A, optionally at least one layer which is electronically insulating but which lets the cations pass through, a second electrochemically active layer capable of reversibly injecting cations, especially a layer of anodic electrochromic material, and finally an electroconductive layer.

Advantageously, the type of material chosen to form layer A is a material which exhibits an electrochromic property. This type of material can also be selected to form the electrochemically active layers of the device. With respect to layer A, it is preferable to block the electrochromic material of which it is composed in the decolored state: in this way, its coloration does not interfere with the variable coloration of the electrochromic materials of the electro-chemically active layers. However, it is also possible to choose to freeze it in a given intermediate state of coloration.

In order for the material making up layer A to be a good ion conductor, it may advantageously be chosen, in the case in which the device operates by reversible injection of proton ions $H^+$, in the form of a metal oxide or a mixture of metal oxides which may be hydrated or non-hydrated. Preferably, they are chosen from the group of tungsten oxide, optionally hydrated, $WO_3.nH_2O$, niobium oxide, optionally hydrated, $Nb_2O_3.nH_2O$, tin oxide, optionally hydrated, $SnO_2.nH_2O$, bismuth oxide, optionally hydrated, $Bi_2O_3.nH_2O$, titanium oxide, optionally hydrated, $TiO_2.nH_2O$, vanadium oxide, optionally hydrated, $V_2O_5.nH_2O$, nickel oxide, optionally hydrated, $NiO_xH_y.nH_2O$ or molybdenum oxide, optionally hydrated, $MoO_3.nH_2O$, where for all these oxides $n \geq 0$. The oxide or the mixture of oxides may also include an additional metal different from the main metal of the oxide, such as titanium, tantalum or rhenium, most particularly if it is desired to hydrate the oxide significantly. These three metals have a tendency to facilitate the hydration of the oxide or of the mixture of oxides in question, which hydration is often advantageous in order to ensure satisfactory proton conduction. In order to favor hydration, alkali metals such as Na, Li and K may also be added as additives.

If, on the other hand, the device operates by reversible injection of lithium ions $Li^+$, the material of layer A must let the lithium ions pass through. It may then be advantageously chosen based on a metal oxide or a mixture of metal oxides which may or many not be lithiated, it (they) being especially selected from the group of nickel oxide $NiO_x$, lithiated nickel oxide $Li_yNiO_x$, a mixture of titanium and cerium oxide $CeTiO_x$, tungsten oxide $WO_3$, niobium oxide $Nb_2O_5$, vanadium oxide $V_2O_5$, and lithiated vanadium oxide $Li_xV_2O_5$.

As regards the choice of the electronically insulating material, this may advantageously be based on an oxide or mixture of oxides. It is, for example, selected from the oxides of a metal in column VB of the Periodic Table, especially tantalum oxide, but also from the oxides belonging to the group of antimony oxide $Sb_2O_5$, zirconium oxide $ZrO_2$, titanium oxide $TiO_2$, silicon oxide $SiO_2$, chromium oxide $CrO_3$ and germanium oxide $GeO_3$. It may, for example, be a mixed tantalum and titanium oxide, zinc oxide in the form of $ZnO(H_3PO_4)_2.nH_2O$ or in the hydrated form of any one of the preceding materials, the latter hydrated oxides being particularly suitable for devices operating by reversible injection of protons.

These materials may furthermore contain additives which promote their hydrophilicity and, therefore, increase their degree of hydration. These additives, which preferably represent only a few percent by weight of the layer, are especially metals such as W, Re or alkali metals such as Li, Na and K.

It is also possible to choose layers of electronically insulating material based on the following compounds or mixtures of compounds: $CeF_3$, hexauranylphosphate HUP, $MgF_2$, $CaF_2$, $SiO_x$, LiF, $Na_3AlF_6$, or based on $Li_3N$, $LiTaO_3$, $LiAlF_4$, $Li_3PO_4$, $LiPO_2$, LiN, $LiNbO_3$, $MgF_2POLi$ or $Li_2WO_4$, the latter series of materials being more particularly suited to operation of the device by reversible injection of lithium ions $Li^+$. Whether the device operates in particular by injection of lithium ions or of protons, it is in fact also possible to choose the electronically insulting layers such that they comprise a material which has become electronically insulating by blocking its primary ability to inject ions, by controlling the potential of these layers. It may thus be a material based on tungsten oxide.

It should also be noted that the materials listed above for forming layer A, whether the system operates by injection of $Li^+$ or $H^+$ ions, as well as the materials listed above for forming the electronically insulating material, may furthermore be at least partially nitrided and/or phosphatized. These layers may be deposited by sputtering, such as by reactive sputtering, in the presence, respectively, of a certain amount of $N_2$ and of $PH_3$, or any molecule containing, respectively, at least one atom of nitrogen and of phosphorus.

The multilayer electrolyte of the invention, comprising at least layer A, may also advantageously comprise at least one layer of another ionically conductive material. This may be an aqueous liquid layer, such as water to which sulfuric or phosphoric acid has been added in the case of reversible injection of protons, or an anhydrous liquid layer, such as propylene carbonate containing a lithium salt in the case of reversible injection of lithium ions. It may also be a layer of gel or of polymer, especially of protonically conductive polymers of the polyoxyethylene/phosphoric acid, POE/$H_3PO_4$, solid-solution type (in this case, the polymer also forms an electronic insulator) or alternatively based on a polymer obtained by the copolymerization of three precursors comprising two types of grafted trialkoxysilanes and a plasticizer having at least one urea group. Suitable polymers which are able to conduct lithium ions include an ionomer obtained by partial neutralization of polyacrylic acid, or a polymer based on branched polyethyleneimine and on a lithium salt. For more details on the nature and synthesis of such polymeric products, reference may advantageously be made to the patents mentioned in the description of the prior art in the present application.

According to the invention, it may also be advantageous to superimpose a number of electrolyte multilayers as defined previously, especially in a split arrangement. It is thus possible to reduce the risk of a surface short circuit appearing in the system. The systems of the invention may thus comprise an "all-solid" split electrolyte multilayer of the $(NiO_xH_y.nH_2O/WO_3.nH_2O)_p$ or $(Ta_2O_5.nH_2O/WO_3.nH_2O)_p$ type, where $p \geq 2$.

As to the electrochemically active layers of the device, as mentioned previously, these layers are preferably selected so as to exhibit an electrochromic property and to be two in number, with a layer of cathodic electrochromic material and a layer of anodic electrochromic material acting as counterelectrode.

In order to form the layer of cathodic electrochromic material, a material or a mixture of materials selected from the group of tungsten oxide $WO_3$, molybdenum oxide $MoO_3$, vanadium oxide $V_2O_5$, niobium oxide $Nb_2O_5$, titanium oxide $TiO_2$, a "cermet" material (a combination of metallic and ceramic material, especially in the form of metal particles in a ceramic matrix, such as $WO_3/Au$ or $WO_3/Ag$), a mixture of tungsten and rhenium oxides $WO_3/ReO_3$, and phosphotungstic acid can be chosen. These materials are particularly suitable in the case of reversible injection of protons and of lithium ions. It is also possible to choose materials based on a metallophthalocyanine or metallodibenzophthalocyanine of transition metals or of rare earths.

In the case in which the device operates by reversible injection of protons, the same materials can be used, optionally in hydrated form.

In order to form the layer of anodic electrochromic material, a material can be selected which satisfies the formula $M_xA_yU_z$, where M is a transition metal, A is the ion used for the reversible injection, for example an alkali metal or a proton, and U is a chalcogenide such as oxygen, sulfur or selenium, Se.

It may, especially in the case of injection of proton ions $H^+$, be a compound or a mixture of compounds belonging to the group of $LiNiO_x$, $IrO_xH_y$, $IrO_xH_yN_z$, $NiO_x$, $NiO_xH_z$, $NiO_xH_yN_z$, $RhO_x$, $CoO_x$, $CrO_x$ and $MnO_x$. It is also possible to select rare-earth, lanthamide or transition-metal hydrides $M_xH_y$, particularly in the case in which the metal is yttrium or lanthanum. In the case of reversible injection of lithium ions $Li^+$, a compound or a mixture of compounds belonging to the group of $LiNiO_x$, $LiMn_2O_4$, $IrO_x$, $Li_xIrO_y$, $NiO_x$, $CeO_x$, $TiO_x$, $CeO_x.TiO_x$, $RhO_x$, $CoO_x$, $CrO_x$, $MnO_x$, $VO_x$, $Li_xCoO_y$, $LiCrO_y$, $Li_xVO_y$, $ReO_x$, $RhO_x$, $PtO_x$, $FeO_x$, $OsO_x$, $CuO_x$ and $PrO_x$, and all these materials in lithiated form is preferred. In the case of the injection of protons or of lithium ions, materials based on hexacyanometalates, especially of the form $M[M'(CN)_6]$, where M and M' belong to the family of transition metals and/or rare earths can be chosen. The following M/M' "pairs" are more particulary used: Fe/Fe (a compound also known by the name Prussian blue), Fe/Ru, Cu/Ru, Fe/Cr, Fe/Os, Cu/Os, Cr/Fe, Fe/Ru, or the "pairs" Ce/Fe, Pr/Fe, Nd/Fe, Sm/Fc, Eu/Fe, Gd/Fe, Tb/Fe, Dy/Fe, Ho/Fe, Er/Fe, Tm/Fe, Yb/Fe and Lu/Fe.

Whether these materials be the cathodic electrochromic material or the anodic electrochromic material, they may furthermore be at least partially nitrided. As a cathodic electrochromic material, $WO_xN_y$ may thus be mentioned.

With regard to the electroconductive layer of the device, there are two possibilities. One is a material based on a doped metal oxide, such as fluorine-doped tin oxide $F:SnO_2$ or tin doped indium oxide, ITO. Another possibility is to use layers of metal or of metal alloy, for example based on gold Au, silver Ag or aluminum Al. The metal layer may be deposited on a thinner metal layer of the Ni/Cr alloy type in order to promote its nucleation. In the most frequent case, the device has two electroconductive layers. They may either be both metal layers or be both based on a doped oxide, or one may be based on metal and the other based on a doped oxide. The choice may be dictated in particular by the intended application of the electrochemical device. It is also possible to superimpose several electroconductive layers. Furthermore, particularly in the case of so-called "all-solid" systems, the final electroconductive layer (the one most distantly removed from the substrate on which the successive layers are deposited) may be made of a stack of $Au/WO_3$ or $NiCr/Au/WO_3$ type, the final layer, made of hard oxide of the $WO_3$ type, protecting the rest of the stack, at least temporarily before mounting, laying down a protective varnish, assembly with a second substrate, etc.

Thus, it may be necessary that these layers be transparent, especially when the devices is intended to operate in transmission, and in this case it is-preferred to use thin oxide-based layers or thin metal layers. However, it may also be intended to operate the device in a reflection mode, and in this case it may be judicious to choose one of the electroconductive layers to be transparent, especially an oxide-based one, and the other layer to be reflecting, this time preferably made of metal and selected so as to have a thickness sufficient to render the device partially or completely opaque.

Advantageously, according to a preferred variant of the invention, the multilayer electrolyte is selected such that all the layers of which it is composed are layers of solid material. Advantageously, all the layers of the device are in fact based on solid materials. Within the context of the invention, "solid material" is understood to mean any material having the mechanical integrity of a solid, in particular any essentially inorganic or organic material or any hybrid material, that is to say one which is partly inorganic and partly organic, such as the materials which may be obtained by sol-gel deposition from organo-inorganic precursors. The system configuration is then called an "all-solid" configuration, which has a clear advantage in terms of ease of manufacture. This is because when the system contains an electrolyte in polymer form, which does not have the mechanical integrity of a solid, for example, this necessitates manufacturing in fact, in parallel, two "half-cells" each consisting of a carrier substrate coated with an electroconductive first layer and then an electrochemically active second layer, these two half-cells then being assembled by inserting the electrolyte between them. With an "all-solid" configuration, the manufacture is simplified since all the layers of the system may be deposited, one after the other, on a single carrier substrate. Since it is no longer necessary to have two carrier substrates, the device is also lighter.

According to the invention, all or some of the layers in the electrochemical device may be deposited using vacuum techniques of the type including sputtering, optionally sputtering assisted by a magnetic field and reactive sputtering, or by evaporation, optionally reactive evaporation, or by techniques involving the decomposition of precursors, such as the pyrolysis technique or the sol-gel technique. Referring to the "all-solid" configuration mentioned above, it is thus possible, for example, to deposit all the layers on a substrate by sputtering, the substrate running in succession through vacuum chambers containing the suitable controlled atmosphere and the suitable target.

The invention also relates to all the applications of the electrochemical device which has been described, and in particular, four of them:

(i) The first application is electrochromic glazing. In this case, advantageously, it is intended that the substrate or substrates of the device be transparent, made of glass or plastic, when the glazing is intended to operate in variable light transmission. If it is desired to give the glazing a mirror function, and to make it operate in variable light reflection, several solutions are possible: either one of the substrates is selected to be opaque and reflecting (for example a metal plate) or the device is combined with an opaque and reflecting element, or one of the electroconductive layers of the device is selected to be metallic in nature and sufficiently thick to be reflecting.

Especially when the glazing is intended to transmit variable light, with a device provided with one or two transparent substrates, it may be mounted as a multiple glazing, especially as a double glazing with another transparent substrate, and/or as a laminated glazing;

(ii) The second application is energy storage elements, more particularly batteries, which may be used, for example, in any equipment involving electronic and/or data-processing means and any equipment requiring an energy storage device which is intrinsic to them, whether autonomous or not;

(iii) The third application is gas sensors;

(iv) The fourth application is display systems in which several electrochromic systems of the invention are then juxtaposed, for example, in the form of electrochromic glazing "chequer-boards" which are individually controlled electrically. It is thus possible to form screens, information panels or advertising panels.

With respect to the first application which is that of electrochromic glazing, the glazings may be advantageously employed in buildings, for example laminated glazings, multiple glazings of the double-glazing or parietodynamic-glazing type, in windows for motor cars or for industrial/public-transport vehicles, in windows for aircraft, in windows for trains, rear-view mirrors and other mirrors, or as optical elements such as camera objectives, or as the front face or element to be placed on or near the front face of the display screens of equipment such as computers or televisions.

Preferred embodiments of the invention may be the type:

a) glass/electroconductive layer(s)/$NiO_xH_y$ or $IrO_xH_y$/[$Ta_2O_5.nH_2O/WO_3.nH_2O/POE$—$H_3PO_4$]/$WO_3$/glass, multilayer electrolyte it being possible for the glass substrates to be replaced by other types of substrates, especially those based on plastics;

b) substrate/electroconductive layer/$WO_3$/[$Ta_2O_5.nH_2O$ or $Sb_2O_5.nH_2O/WO_3.nH_2O/Sb_2O_5.nH_2O$ or $Ta_2O_5.nH_2O$] electroconductive layer(s)/$NiO_xH_y$ or $H_xIrO_y$ or $NiIr_zO_xH_y$ or $IrSn_zO_xH_y$, an equivalent stack to the previous one, but by substituting for the three-layer electrolyte multilayer a sequential electrolyte multilayer:

c) $(NiO_xH_y.nH_2O/WO_3.nH_2O)_n$, where $n \geq 1$, thus, a type of electrolyte multilayer having repeated sequences, especially a split one, is illustrated.

The devices of the invention which are used as a battery may also be employed in the building industry or vehicle industry, or form part of computer- or television-type equipment.

In fact, there may be very many different and particularly advantageous applications as batteries of the electrochemical systems according to the invention since, especially in the case where very compact "all-solid", flat, non-polluting (containing no lead or cadmium or liquid acid) and rechargeable batteries. If particularly thin batteries are required, it is possible to use the "all-solid" systems of the invention, in which the substrate or substrates protecting the functional layers may be substrates made of thin flexible plastic such as polyethylene terephthalate PET. It is, thus, possible to adapt system structures diagrammatically of the type:

plastic substrate (PET)/metal layer/electrochemically active layer/multilayer electrolyte/electrochemically active layer/metal layer/protective material.

With such a structure, such batteries may find application in vehicles, for example in coiled form or in the form of superimposed layers. They may also be used in smart cards: in this case they enable the electronic element of the card to be given an active function (they may be encapsulated in the thickness of the card).

Other applications of these batteries may, non-exhaustively, also be mentioned: self-powered labels, "intelligent" packaging, thin watches, any self-powered electronic apparatus, biological implants, batteries combined with photovoltaic-type solar cells for storing energy, and all domestic electrical appliances.

Still within the battery application, it may be noted that if it is desired to increase the value of the electrical voltage delivered by the battery, it is possible to make an arrangement consisting in putting at least two of them in series, the last electroconductive layer of the first system being merged with the first electroconductive layers, as a layer which is both electroconductive and an ion barrier, especially a metal layer (or multilayer) of the Ag, Au and/or NiCr alloy type. Of course, based on the same principle, series arrangements of n systems, where n>2, may be provided.

It is thus possible to have a stack of the type:

a) substrate/F:$SnO_2$/[$WO_3$/$Ta_2O_5$.$nH_2O$ or $Sb_2O_5$.$nH_2O$/ $WO_3$.$nH_2O$/$IrO_x$/NiCr]$_n$/substrate.

(Here, and throughout the present text, it should be understood that the electroconductive layers of the F:$SnO_2$ type can be substituted by layers of other doped metal oxides of the ITO type or by metal layers of the Ag, Au, NiCr type).

It should be noted that all of the figures extremely diagrammatic and do not show the normal proportions between the various elements shown, so as to make them easier to understand.

The non-limiting examples relate to any electrochromic glazing exhibiting reversible injection of protons $H^+$ and using substrates of clear soda-lime silica glass 4 mm in thickness. All the metal-based layers coating these substrates are obtained by magnetic-field-assisted sputtering in an inert atmosphere (Ar) using a target of the corresponding metal. All the oxide-based layers are obtained by this technique using a metal target, but in a reactive atmosphere containing oxygen, and optionally hydrogen and/or water vapor as well in the case of an oxide obtained in hydrated form. All the layers based on a fluorinated oxide, such as F:$SnO_2$, are deposited by sputtering in a reactive atmosphere containing both oxygen and a fluorine-containing gas, either by pyrolysis in the solid phase or by chemical vapor deposition using precursors of the organometallic type, in a known manner. The polymer layer are obtained by casting. It goes without saying that the invention is not limited to these types of deposition techniques and that any other technique may be profitably used. Thus, the oxide based layers may also be deposited by pyrolysis or by sol-gel.

In these examples, the details of the power supply for the glazing will not be given. The power is supplied using a voltage generator, as shown by reference 10 in FIGS. 1 and 2. it could also be supplied using a current generator. For more details on the various methods of supplying power, the configuration of the current leads or the various control systems, reference is made to Patents EP-O 408,427, EP-O 475,847, EP-O 568,457, EP-O 584, 003 and EP-O 683,419.

Example 1 is an electrochromic glazing whose electrolyte contains a polymer, the subsequent examples relating to "all-solid" electrochromic glazing.

EXAMPLE 1

Example 1 corresponds to the glazing shown in FIG. 1. It consists of a first glass substrate 1 and then, in succession:

(i) a first electroconductive layer 2 of F:$SnO_2$ 300 nm in thickness;

(ii) a first layer of anodic electrochromic material 3, made of hydrated nickel oxide $NiO_xH_y$ 185 nm in thickness (it could be replaced by a layer of hydrated iridium oxide);

(iii) an electrolyte 4 split into a first layer 4a of hydrated tantalum oxide $Ta_2O_5.H_x$ 100 nm in thickness, a second layer 4b of hydrated tungsten oxide $WO_3.H_x$ 200 nm in thickness and a third layer 4c of polyoxyethylene/ phosphoric acid POE/$H_3PO_4$ solid solution, 100 microns in thickness;

(iv) a second layer 5 of cathodic electrochromic material, based on tungsten oxide, 350 nm in thickness;

(v) a second layer of 6 of F:$SnO_2$ 300 nm in thickness and then a second glass substrate 7.

Also shown are the current leads 11, 12, in the form of strips placed on the opposite ends of the two electroconductive layers 2, 6 and electrically connected to a voltage generator 10.

In accordance with the invention, this structure is an example of a three-layer electrolyte which contains a layer 4b made of cathodic electrochromic material which has been hydrated in order to make it protonically conductive and the state of injection of which has been blocked by placing it between two layers 4a, 4c which are both protonically conductive and electronically insulating. Thus, the degree of oxidation of layer 4b is maintained constant, since it is electrically isolated from the two electroconductive layers 2, 6 of the system.

Compared to an electrolyte containing only POE/$H_3PO_4$ polymer layer 4c, the three-layer electrolyte of the invention makes it possible to preserve the integrity of the "active" electrochromic materials of the system and more particularly the integrity and durability of the layer of anodic electrochromic material 3, called the counterelectrode.

In order to quantify this improved durability, the following test was carried out: a "half-cell" according to Example 1 was produced, that is to say that the following stack was produced:

glass (1)/F:$SnO_2$ (2)/$NiO_xH_y$ (3)/$Ta_2O_5.H_x$ (4a)/$WO_3.H_x$ (4b).

In parallel, by way of comparison, the following stack was produced:

glass (1)/F:$SnO_2$ (2)/$NiO_xH_y$ (3).

Next, these two half-cells were cycled from −1.4 to +0 volts in an aqueous solution containing $H_3PO_4$ in a 0.25 M concentration, with as reference a saturated calomel electrode.

Figure 4:
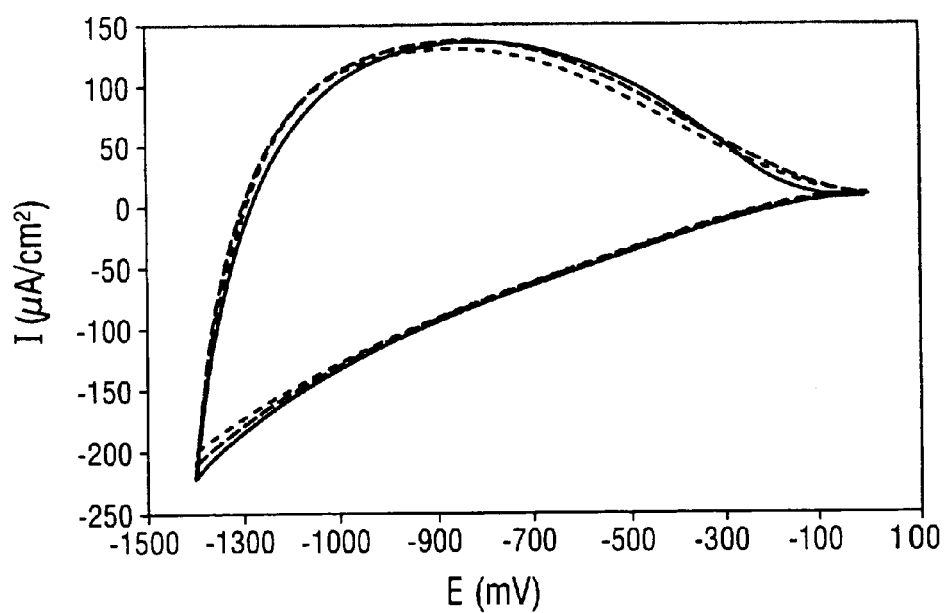
FIG. 4 is a voltamogram of a half-cell of an item of glazing of FIG. 1.

The voltamogram in FIG. 4 corresponds to the electrical behavior of the half-cell according to Example 1: it shows the latter operating correctly. Table 2 below collates, as a function of the cycle number (No.), the amount of charge injected $Q_{inj}$ and the amount of charge ejected $Q_{ej}$ by the half-cell, in mC/cm$^2$:

| Cycle No. | $Q_{ej}$ | $Q_{inj}$ |
|-----------|----------|-----------|
| 2         | 9.0      | −8.9      |
| 10        | 9.7      | −9.6      |
| 12        | 9.6      | −9.5      |
| 20        | 9.5      | −9.4      |

This clearly shows that, whatever the number of cycles performed, the amount of charge injected or ejected per cycle is virtually constant, which proves the good reproducibility of the anodic electrochromic material in switching from one oxidation state to another. This material thus retains its integrity in a highly acid medium, showing that the $Ta_2O_5.nH_2O/WO_3.nH_2O$ electrolyte "portion" protects it effectively.

Moreover, when the half-cell is subjected to a potential of −0.4 volts with respect to the saturated calomel electrode, the half-cell remains in the decolored state. Now, this is a value of potential for which an electrochromic material such as tungsten oxide becomes strongly blue. If it remains transparent, it, therefore, means that the $Ta_2O_5.nH_2O$ layer is electronically insulating in a satisfactory manner, blocking it in a decolored state.

On the other hand if the half-cell made by way of comparison is immersed in the 0.25 M $H_3PO_4$ aqueous solution, the half-cell, therefore, being devoid of hydrated $WO_3$ and $Ta_2O_5$ layers, the nickel-oxide-based anodic electrochromic material is seen to dissolve almost immediately and, therefore, loses its functionality completely.

EXAMPLE 2

This example corresponds to an item of glazing which is not shown. It consists of a single glass substrate on which all the layers of the system have been deposited one after the other, i.e.:

(i) an electroconductive layer of $F:SnO_2$ 300 nm in thickness;

(ii) a layer of cathodic electrochromic material made of tungsten oxide, 380 nm in thickness;

(iii) a two-layer electrolyte split into a hydrated tantalum oxide layer $Ta_2O_5.nH_2O$ 18 nm in thickness and a hydrated tungsten oxide layer $WO_3.nH_2O$ 200 nm in thickness (there is n third layer here, but one could also be provided, based on $Ta_2O_5.nH_2O$ like the first layer);

(iv) a layer of anodic electrochromic material based on hydrated iridium oxide $H_xIrO_y$ 45 nm in thickness (it may be replaced by hydrated nickel oxide);

(v) an electroconductive layer of ITO, 200 nm in thickness.

Figure 5:
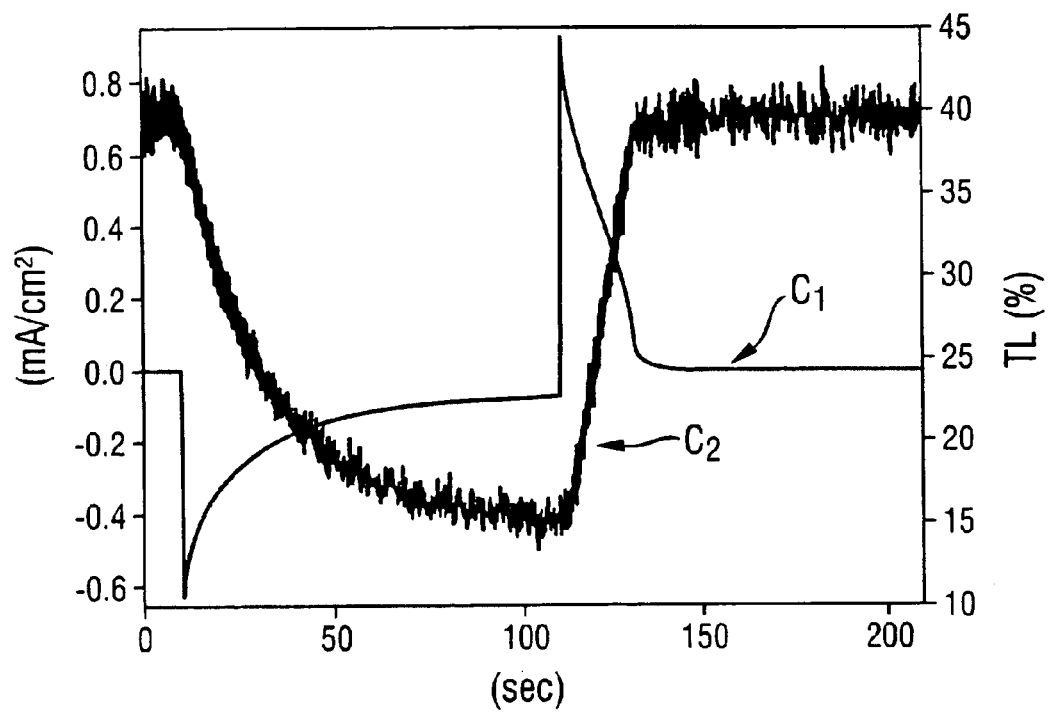
FIG. 5 is a current-density curve during a switching operation of a glazing of FIG. 2.

This glazing is operated by applying a potential of −1.4 V in order to induce the coloration of the system and 0 V in order to cause its decoloration. FIG. 5 shows the behavior of the glazing subjected to such a coloration/decoloration cycle: curve $C_1$ indicates the variation of the current density in mA/cm$^2$ as a function of time expressed in seconds. Curve $C_2$ indicates the variation in light transmission coefficient $T_L$ in % using the $D_{65}$ illuminant, also as a function of time expressed in seconds.

The glazing operates completely satisfactorily.

EXAMPLE 3

Figure 2:
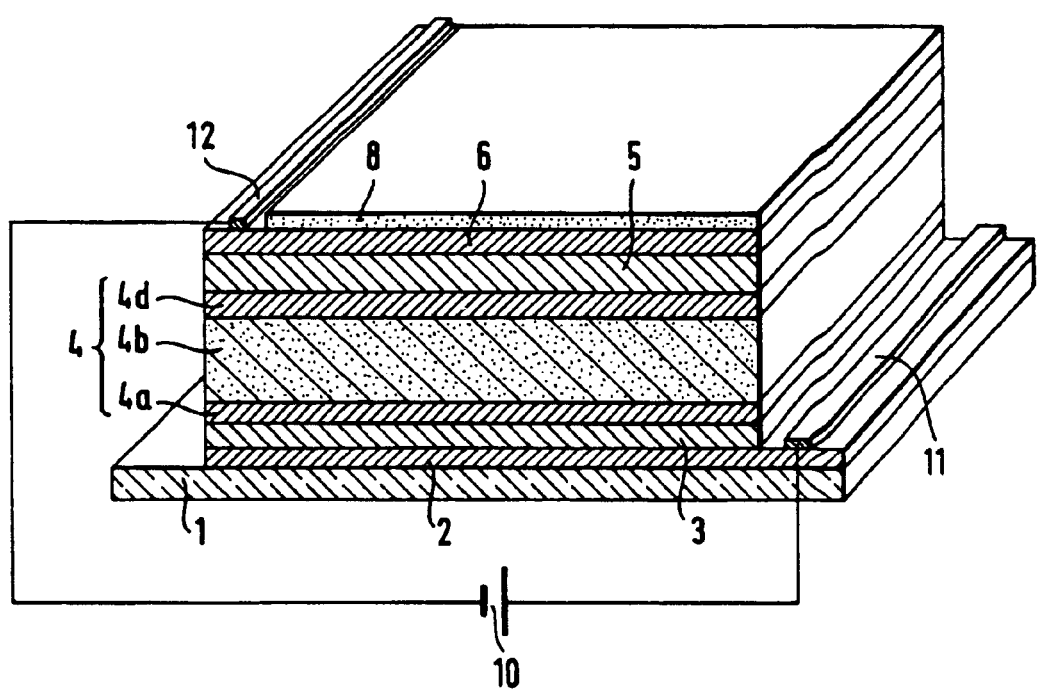
FIG. 2 is a presentation of a second embodiment of an electrochromic glazing of the invention.

This example corresponds to the glazing shown in FIG. 2. It consists of a glass substrate 1, on which the following layers are deposited one after the other:

(i) An electroconductive layer 2 of ITO or of $F:SnO_2$ 300 nm in thickness;

(ii) A layer 3 of cathodic electrochromic material made of tungsten oxide $WO_3$;

(iii) A three-layer electrolyte 4 composed of a layer 4a of hydrated tantalum oxide, a layer 4b of hydrated tungsten oxide having a thickness identical to the same layers in the previous example, and, in addition, a layer 4d of hydrated tantalum oxide similar to layer 4a and 18 nm in thickness;

(iv) A layer 5 of anodic electrochromic material made of nickel oxide $NiO_x$ approximately 200 nm in thickness or of iridium oxide $IrO_x$ approximately 50 nm in thickness, these oxides optionally being hydrated;

(v) An electroconductive layer 6 of silver 10 nm in thickness;

(vi) A set of layers 8 to protect the subjacent silver layer, especially from oxidation. Preferably, this is a thin layer of NiCr from 1 to 3 nm in thickness surmounted by a layer of material, for example dielectric material, especially based on an oxide such as tin oxide, having a thickness of between 2 and 50 nm. (The NiCr layer protects the silver layer from oxidation during deposition of the $SnO_2$ layer by sputtering in the presence of oxygen, in the final glazing it is, therefore, partially or completely oxidized). A second NiCr layer may also optionally be sandwiched between the silver layer 6 and the electrochemically active layer 5.

EXAMPLE 4

Although the previous examples operated in transmission, using electroconductive layers which are essentially transparent since, whether made of oxide or of metal, they are in this case very thin, this example, with the same structure in FIG. 2, relates to an item of electrochromic glazing exhibiting a mirror function.

The stack of layers of the same as an Example 3, apart from two characteristics: here, layer 4c of hydrated tantalum oxide is omitted (this layer, therefore, being in fact optional) and the thickness of the electroconductive silver layer 6 is increased to a thickness greater than 30 nm, for example approximately 50 nm (it may be replaced by an aluminum layer of the same thickness).

In this case, the observer looks at the glazing through the substrate 1 and sees it color modification since the first electroconductive layer 2 is transparent, the mirror reflecting effect being produced by the second electronconductive metal layer 6.

Figure 3:
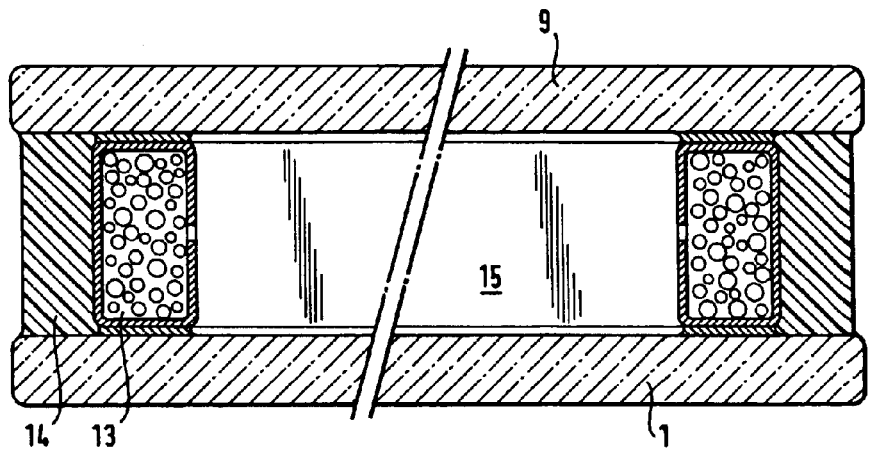
FIG. 3 is a representation of a double-glazing arrangement of the glazing of FIG. 2.

The "all-solid" electrochromic glazing was mounted on double glazing, as shown highly diagrammatically in FIG. 3, the substrate 1 bearing the stack of layers 2 and 8, which is not shown, is bound to a second glass substrate 9 via a gas-filled cavity 15, so that the stack of layers faces this gas-filled cavity. In order to avoid any embrittlement of the multilayer stack by exposure to variations in moisture content, it is well to provide means for strictly controlling the relative humidity within the gas-filled cavity. Here, a metal insert 13 filled with particles, for the purpose of regulating the relative humidity, has been provided, on which a peripheral seal 14 made of polysulfide and/or butyl rubber has been laid.

An electrochromic glazing assembly according to any one of the examples may be envisaged, especially an insulating multiple glazing and/or as laminated glazing. Reference may be made, for example, to patent EP-O 575,207.

The following conclusions may be drawn from this series of examples.

It is desired to keep an electrolyte in the form of polymer in which a strong acid such as $H_3PO_4$ has been dissolved, which is to the case in Example 1, the invention, by "supplementing" this electrolyte with an "inhibited" electrochromic material and with a layer of hydrated oxide, very effectively solves the problem of preventing the counter-electrode made of anodic electrochromic material from degrading.

If, on the other hand, it is preferred to switch to an all-solid system, which is the case in the other examples, the "inhibited" electrochromic material may then completely replace the usual polymer electrolyte. By electronically insulating it from at least one of the electron sources, the advantages—the previous advantage, that is to say the preservation of the counterelectrode, and the advantages of manufacturing by successive depositions on the same substrate are combined. Mounted as double glazing, as shown in FIG. 3, the all-solid glazing is particularly advantageous: the layers are protected and a saving in terms of weight and overall size compared to double glazing using two-substrate electrochromic glazing is obvious.

It is also important to emphasize that the invention is simple to implement, insofar as layer 4b, specific to the invention, is made of a material generally of the type of those already used for their electrochromic properties, such as tungsten oxide: even if it is necessary to adjust the deposition conditions correctly, especially in order to obtain the desired optional degree of hydration, the manufacturer thereof was already, prior to the invention, well controlled. Above all, the invention has in fact imparted, surprisingly, a second function on often already-known electrochromic materials.

Finally, whether the electrochromic glazing transmits light (Examples 1 to 3) or reflects light (Example 4), it may be advantageous to adjust the characteristics of the layers which it uses in order to impart a given optical appearance thereto. Thus, it is possible to vary the refractive indices and/or the thickness of the metal- or oxide-based layers in order to obtain glazings which will switch within a given light transmission range and will have an appearance which is reflecting to a greater or lesser extent or exhibits a given colorimetry.

The optical characteristics of the glazing may also be adjusted by means of additional layers which may, for example, be inserted between the substrates and the electroconductive layers, or even be "external" to the electrochromic system, for example by being deposited on the other face of the glass substrate.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A display element of the information screen or advertising panel type, comprising:
    a plurality of juxtaposed electrochemical devices, each comprising at least one substrate (1,7), at least one electroconductive layer (2,6), at least one electrochemically active layer (3,5) that is capable of reversibly inserting ions, and an electrolyte (4), wherein the electrolyte (4) is a layer or a multilayer stack comprising at least one layer (4b) made of an ionically conductive material that is capable of reversibly inserting said ions but whose overall degree of oxidation is maintained essentially constant.

2. The display element according to claim 1, wherein said inserted ions are $H^+$, $Li^+$, $Na^+$, $Ag^+$ or $K^+$.

3. The display element according to claim 1, wherein the overall degree of oxidation of the layer (4b) of the electrolyte (4) is maintained essentially constant by electrically insulating said layer (4b) from at least one of the electron sources of the device by interposing at least one layer (4a,4d) of an electronically insulating material.

4. The display element according to claim 3, wherein the layer(s) (4a,4d) made of electronically insulating material is ionically conductive/ion-permeable.

5. The display element according to claim 4, wherein the layer(s) (4a,4d) made of electronically insulating material forms part of the multilayer electrolyte (4) in direct contact with at least one of the faces of the layer (4b) having an overall degree of oxidation maintained essentially constant.

6. The display element according to claim 3, wherein the layer or layers (4a,4d) of electronically insulating material comprises at least one oxide of a metal of column VB of the Periodic Table and at least one metal oxide selected from the group consisting of antimony oxide $Sb_2O_5$, zirconium oxide $ZrO_2$, titanium oxide $TiO_2$, silicon oxide $SiO_2$, chromium oxide $CrO_3$, these oxides being optionally hydrated and optionally comprising a hydratable metal additive of W, Re or an alkali metal.

7. The display element according to claim 6, wherein said metal oxide is a mixed Ta—Ti oxide, $GeO_3$ or $ZnO(H_3PO_4)_2 \cdot H_2O$.

8. The display element according to claim 3, wherein the layers (4a,4c) of electronically insulating material is formed of $CeF_3$, hexa-uranylphosphate HUP, $MgF_2$, $CaF_2$, $SiO_x$, LiF, $Na_3AlF_6$ or based on $Li_3N$, $LiTaO_3$, $LiAlF_4$, $Li_3PO_4$, $LiPO_2$, LiN, $LiNbO_3$, $MgF_2POLi$ or $Li_2WO_4$, said device operating by reversible insertion of lithium ions from the electrochemically active layer or layers (3,5).

9. The display element according to claim 3, wherein the layers (4a,4d) made of electronically insulating material is a material whose electrical insulation properties are obtained by blocking its ability to insert ions by controlling its potential.

10. The display element according to claim 1, wherein the overall degree of oxidation of the layer (4b) of the electrolyte (4) is maintained essentially constant by keeping the potential of said layer (4b) at values outside the range of potentials causing a variation in the degree of ion insertion of the material of which it is composed.

11. The display element according to claim 1, wherein, in said device, in succession, an electroconductive layer (2), an electrochemically active layer (3) that is capable of reversibly inserting cations, the electrolyte (4) comprising layer (4b) made of ionically conductive material that is capable of reversibly inserting cations but whose overall degree of oxidation is maintained essentially constant, and optionally at least one electronically insulating layer (4a,4c), a second electrochemically active layer (5) that is capable of reversibly inserting cations, and an electroconductive layer (6).

12. The display element according to claim 11, wherein said layer (3) is a cathodic electrochromic material and said layer (5) is of an anodic electrochromic material.

13. The display element according to claim 1, wherein the material of layer (4b) that is capable of reversibly inserting the ions but whose degree of oxidation is maintained essentially constant, is a material exhibiting an electrochromic property.

14. The display element according to claim 1, wherein the material exhibiting an electrochromic property of the layer (4b) is maintained in the decolored state or in an intermediate state of coloration.

15. The display element according to claim 1, wherein the electrochemical device operates by reversible insertion of protons from the an electrochemically active layer or layers (3,5) and in that the material of the layer (4b) of the electrolyte (4), which is capable of reversibly inserting protons, but whose degree of oxidation is maintained essentially constant, is based on a metal oxide or a mixture of metal oxides, optionally hydrated, and selected from the group consisting of tungsten oxide, optionally hydrated, $WO_3.nH_2O$, niobium oxide, optionally hydrated, $Nb_2O_5.nH_2O$, optionally hydrated, $NiO_xH_y.nH_2O$, tin oxide, optionally hydrated, $SnO_2.nH_2O$, bismuth oxide optionally hydrated, $Bi_2O_3.nH_2O$, titanium oxide, optionally hydrated, $TiO_2.nH_2O$, vanadium oxide, optionally hydrated, $V_2O_5.nH_2O$, molybdenum oxide, optionally hydrated, $MoO_3.nH_2O$, where $n \geq 0$ and optionally comprising an additive metal, which can be hydrated, of titanium, tantalum, rhenium, or of an alkali metal.

16. The display element according to claim 1, where the electrochemical device operates by reversible insertion of lithium ions $Li^+$ from the an electrochemically active layer or layers (3,5), the material of said layer (4b) of the electrolyte (4), which is capable of reversibly inserting lithium ions $Li^+$, but whose degree of oxidation is maintained essentially constant, being based on a metal oxide or a mixture of metal oxides, which optionally are lithiated and are selected from the group consisting of nickel oxide $NiO_x$, lithiated nickel oxide $Li_yNiO_x$, a mixture of titanium and cerium oxides $CeTiO_x$, tungsten oxide $WO_3$, niobium oxide $Nb_2O_5$, vanadium oxide $V_2O_5$ and lithiated oxide vanadium oxide $Li_xV_2O_5$.

17. The display element according to claim 1, wherein the materials which form layer (4b) are capable of reversibly inserting the ions but whose degree of oxidation is maintained essentially constant and/or materials forming the layers (4a,4d) made of electronically insulating material are nitrided and/or phosphatized.

18. The display element according to claim 1, wherein the multilayer electrolyte (4) comprises a layer made of an ionically conductive material (4c) in the form of an aqueous liquid or of an anhydrous liquid or based on polymer(s) or on a gel(s).

19. The display element according to claim 1, wherein the electrochemically active layers (3,5) comprise a layer (5) of cathodic electrochromic material selected from the group consisting of and in that the material of the layer (4b) of the electrolyte (4), which is capable of reversibly inserting protons, but whose degree of oxidation is maintained essentially constant, is based on a metal oxide or a mixture of metal oxides, optionally hydrated, and selected from the group consisting of tungsten oxide $WO_3$, molybdenum oxide $MoO_3$, vanadium oxide $V_2O_5$, niobium oxide $Nb_2O_5$, titanium oxide $TiO_2$ a cermet material of the $WO_3/Au$ or $WO_3/Ag$ type, a mixture of tungsten and rhenium oxides $WO_3/ReO_3$, and phosphotungstic acid, metallophthalocyanines or metallodibenzophthalocyanines of transition metals or of rare earths, optionally nitrided.

20. The display element according to claim 1, wherein the electrochemically active layers comprise a layer (3) of anodic electrochromic material in the form $M_xA_yU_z$, where M is a transition metal, A is the ion used for the reversible insertion, and U is a chalcogenide, which is optionally nitrided.

21. The display element according to claim 20 wherein the chalcogenide is S, O or Se.

22. The display element according to claim 1, wherein the electrochemically active layers comprise a layer (3) of anodic electrochromic material which, in the case of the reversible insertion of protons, is selected from the group consisting of $LiNiO_x$, $IrO_xH_y$, $IrO_xH_yN_z$, $NiO_x$, $NiO_xH_y$, $NiO_xH_yN_z$, $RhO_x$, $CoO_x$, $CrO_x$, $MnO_x$, and a hydride of a rare earth, of a lanthanide or of transition metals and, in the case of reversible insertion of lithium ions $Li^+$ selected from the group consisting of $LiNO_x$, $LiMn_2O_4$, $IrO_x$, $Li_xIrO_y$, $NiO_x$, $CeO_x$, $TiO_x$, $CeO_x$-$TiO_x$, $RhO_x$, $CoO_x$, $CrO_x$, $MnO_x$, $VO_x$, $Li_xCoO_y$, $LiCrO_y$, $LiVO_y$, $ReO_x$, $RhO_x$, $PtO_x$, $FeO_x$, $OsO_x$, $CuO_x$, $PrO_x$, these compounds being optionally lithiated an or nitrided and, in the case of insertion of protons or of $Li^+$ or of hexacyanometalates, of formula $M[M'(CN)_6]$, with M and M' being transition metals and/or rare earths.

23. The display element according to claim 1, wherein at least one of the electroconductive layers (2,6) comprises at least one doped metal oxide selected from the group consisting of ITO or $SnO_2$:F, or a metal or a metal alloy selected from the group consisting of gold, silver, aluminum or Ni—Cr alloy or is the superposition of several layers of these materials.

24. The display element according to claim 1, wherein the multilayer electrolyte (4) and all of the layers of the said device contain only layers of solid material.

25. The display element according to claim 1, wherein the multilayer electrolyte comprises a layer made of an electric insulator in the form of a gel or a polymer.

26. The display element according to claim 1, wherein the multilayer electrolyte is $(NiO_xH_y.n\ H_2O/WO_3.n\ H_2O)_n$, with $n \geq 1$.

27. The display element according to claim 1, wherein the multilayer electrolyte is $(NiO_xH_y.n\ H_2O/WO_3.n\ H_2O)_p$ or $(Ta_2O_5.n\ H_2/WO_3.n\ H_2O)_p$ with $n \geq 2$.

28. The display element according to claim 1, wherein at least a substrate is a plastic substrate.

29. The display element according to claim 1, wherein at least a substrate is a thin flexible plastic sheet.

* * * * *